US009413686B2

(12) United States Patent
Katar et al.

(10) Patent No.: US 9,413,686 B2
(45) Date of Patent: Aug. 9, 2016

(54) ESTABLISHING A UNIQUE END-TO-END MANAGEMENT KEY

(75) Inventors: Srinivas Katar, Gainesville, FL (US); Lawrence W. Yonge, III, Ocala, FL (US); Manjunath Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

(21) Appl. No.: 11/970,339

(22) Filed: Jan. 7, 2008

(65) Prior Publication Data

US 2008/0298589 A1     Dec. 4, 2008

Related U.S. Application Data

(60) Provisional application No. 60/941,949, filed on Jun. 4, 2007.

(51) Int. Cl.
| | |
|---|---|
| *H04L 9/08* | (2006.01) |
| *H04L 12/915* | (2013.01) |
| *H04L 12/28* | (2006.01) |
| *H04L 12/721* | (2013.01) |
| *H04L 12/727* | (2013.01) |
| *H04L 12/733* | (2013.01) |
| *H04L 12/729* | (2013.01) |
| *H04L 12/761* | (2013.01) |
| *H04L 12/413* | (2006.01) |
| *H04L 12/44* | (2006.01) |

(52) U.S. Cl.
CPC .......... *H04L 47/787* (2013.01); *H04L 12/2801* (2013.01); *H04L 12/413* (2013.01); *H04L 45/12* (2013.01); *H04L 45/121* (2013.01); *H04L 45/122* (2013.01); *H04L 45/123* (2013.01); *H04L 45/125* (2013.01); *H04L 45/16* (2013.01); *H04B 2203/5445* (2013.01); *H04L 12/2856* (2013.01); *H04L 12/44* (2013.01)

(58) Field of Classification Search
CPC ......... H04L 9/083; H04L 63/00; H04L 63/08; H04L 63/0428; H04L 63/062
See application file for complete search history.

(56) References Cited

U.S. PATENT DOCUMENTS

| | | | |
|---|---|---|---|
| 4,578,530 A * | 3/1986 | Zeidler | 705/71 |
| 4,689,786 A | 8/1987 | Sidhu et al. | |
| 4,807,248 A | 2/1989 | Pyatt et al. | |

(Continued)

FOREIGN PATENT DOCUMENTS

| | | |
|---|---|---|
| EP | 1748574 | 1/2007 |
| EP | 1748597 A1 | 1/2007 |

(Continued)

OTHER PUBLICATIONS

Afkhamie et al., "An Overview of the upcoming HomePlug AV Standard", May 2005, IEEE 0-7803-8844-5/05, pp. 400-404.

(Continued)

*Primary Examiner* — Brandon Hoffman
(74) *Attorney, Agent, or Firm* — DeLizio Law, PLLC

(57) ABSTRACT

Systems and methods for communicating and authenticating end-to-end management keys to stations to facilitate communications between stations in the network. A nonce based upon a pseudo-random number generated by the station(s) can be included with the end-to-end management key (EMK). The station(s) can compare the nonce to the generated pseudo-random number to authenticate the EMK.

22 Claims, 7 Drawing Sheets

(56) References Cited

U.S. PATENT DOCUMENTS

| | | | |
|---|---|---|---|
| 5,328,530 A | 7/1994 | Semiatin et al. | |
| 5,359,625 A | 10/1994 | Vander Mey et al. | |
| 5,491,750 A * | 2/1996 | Bellare | H04L 9/0822 |
| | | | 380/279 |
| 5,570,355 A | 10/1996 | Dail et al. | |
| 5,613,012 A | 3/1997 | Hoffman et al. | |
| 5,617,421 A | 4/1997 | Chin et al. | |
| 5,682,428 A | 10/1997 | Johnson | |
| 5,732,076 A | 3/1998 | Ketseoglou et al. | |
| 6,074,086 A | 6/2000 | Yonge, III | |
| 6,111,919 A | 8/2000 | Yonge, III | |
| 6,141,355 A | 10/2000 | Palmer et al. | |
| 6,167,137 A | 12/2000 | Marino et al. | |
| 6,173,400 B1 * | 1/2001 | Perlman et al. | 713/172 |
| 6,185,185 B1 | 2/2001 | Bass et al. | |
| 6,188,690 B1 | 2/2001 | Holden et al. | |
| 6,189,040 B1 | 2/2001 | Oohara | |
| 6,201,794 B1 | 3/2001 | Stewart et al. | |
| 6,243,761 B1 | 6/2001 | Mogul et al. | |
| 6,269,132 B1 | 7/2001 | Yonge, III | |
| 6,269,163 B1 | 7/2001 | Rivest et al. | |
| 6,272,135 B1 | 8/2001 | Nakatsugawa | |
| 6,278,685 B1 | 8/2001 | Yonge, III et al. | |
| 6,307,940 B1 | 10/2001 | Yamamoto et al. | |
| 6,310,892 B1 | 10/2001 | Olkin | |
| 6,388,995 B1 | 5/2002 | Gai et al. | |
| 6,519,231 B1 | 2/2003 | Ding et al. | |
| 6,574,195 B2 | 6/2003 | Roberts | |
| 6,591,364 B1 * | 7/2003 | Patel | 713/170 |
| 6,606,303 B1 | 8/2003 | Hassel et al. | |
| 6,631,136 B1 | 10/2003 | Chowdhury et al. | |
| 6,711,163 B1 | 3/2004 | Reid et al. | |
| 6,775,656 B1 | 8/2004 | Gettwart et al. | |
| 6,804,252 B1 | 10/2004 | Johnson | |
| 6,904,462 B1 | 6/2005 | Sinha | |
| 6,910,136 B1 * | 6/2005 | Wasserman et al. | 726/4 |
| 7,039,021 B1 * | 5/2006 | Kokudo | 370/310 |
| 7,065,643 B1 | 6/2006 | Cornils et al. | |
| 7,085,284 B1 | 8/2006 | Negus | |
| 7,089,298 B2 | 8/2006 | Nyman et al. | |
| 7,181,620 B1 * | 2/2007 | Hur | 713/171 |
| 7,234,058 B1 * | 6/2007 | Baugher et al. | 713/163 |
| 7,346,021 B2 | 3/2008 | Yoshizawa et al. | |
| 7,350,076 B1 * | 3/2008 | Young et al. | 713/169 |
| 7,352,770 B1 | 4/2008 | Yonge, III et al. | |
| 7,369,579 B2 | 5/2008 | Logvinov et al. | |
| 7,395,097 B2 | 7/2008 | Perdomo et al. | |
| 7,409,543 B1 * | 8/2008 | Bjorn | 713/155 |
| 7,496,039 B2 | 2/2009 | Yamada et al. | |
| 7,506,042 B2 | 3/2009 | Ayyagari | |
| 7,558,294 B2 | 7/2009 | Yonge, III et al. | |
| 7,558,575 B2 | 7/2009 | Losh et al. | |
| 7,573,891 B1 | 8/2009 | Chow et al. | |
| 7,609,681 B2 | 10/2009 | Kurobe et al. | |
| 7,668,191 B2 | 2/2010 | Steinback et al. | |
| 7,684,333 B1 | 3/2010 | Dasylva et al. | |
| 7,756,039 B2 | 7/2010 | Yonge, III et al. | |
| 7,797,751 B1 | 9/2010 | Hughes et al. | |
| 7,804,842 B2 | 9/2010 | Malik et al. | |
| 7,826,475 B2 | 11/2010 | Lee et al. | |
| 7,826,618 B2 | 11/2010 | Klingler et al. | |
| 7,894,487 B2 | 2/2011 | Yonge, III et al. | |
| 7,949,356 B2 | 5/2011 | Yonge, Iii et al. | |
| 7,961,694 B1 | 6/2011 | Chan et al. | |
| 8,112,358 B2 | 2/2012 | Yonge, III et al. | |
| 8,170,051 B2 | 5/2012 | Yonge, III et al. | |
| 8,429,406 B2 | 4/2013 | Yonge et al. | |
| 8,467,369 B2 | 6/2013 | Yonge, III et al. | |
| 8,488,615 B2 | 7/2013 | Yonge, III et al. | |
| 8,503,480 B2 | 8/2013 | Yonge, III et al. | |
| 8,510,470 B2 | 8/2013 | Yonge, III et al. | |
| 8,930,572 B2 | 1/2015 | Yonge, III et al. | |
| 8,989,379 B2 | 3/2015 | Katar et al. | |
| 2001/0000709 A1 | 5/2001 | Takahashi et al. | |
| 2002/0015496 A1 | 2/2002 | Weaver et al. | |
| 2002/0025810 A1 | 2/2002 | Takayama et al. | |
| 2002/0029260 A1 | 3/2002 | Dobbins et al. | |
| 2002/0060986 A1 | 5/2002 | Fukushima et al. | |
| 2002/0097679 A1 | 7/2002 | Berenbaum | |
| 2002/0107023 A1 | 8/2002 | Chari et al. | |
| 2002/0114303 A1 | 8/2002 | Crosbie et al. | |
| 2002/0122411 A1 | 9/2002 | Zimmerman et al. | |
| 2002/0124177 A1 | 9/2002 | Harper et al. | |
| 2002/0133622 A1 | 9/2002 | Pinto | |
| 2002/0137462 A1 | 9/2002 | Rankin | |
| 2002/0141417 A1 | 10/2002 | Umayabashi | |
| 2003/0012166 A1 | 1/2003 | Benveniste | |
| 2003/0018812 A1 | 1/2003 | Lakshminarayana et al. | |
| 2003/0022978 A1 | 1/2003 | Hohner et al. | |
| 2003/0048183 A1 | 3/2003 | Vollmer et al. | |
| 2003/0067892 A1 | 4/2003 | Beyer et al. | |
| 2003/0086437 A1 | 5/2003 | Benveniste | |
| 2003/0095551 A1 | 5/2003 | Gotoh et al. | |
| 2003/0137993 A1 | 7/2003 | Odman | |
| 2003/0193959 A1 | 10/2003 | Lui et al. | |
| 2003/0224784 A1 | 12/2003 | Hunt et al. | |
| 2003/0228846 A1 | 12/2003 | Berliner et al. | |
| 2003/0229783 A1 | 12/2003 | Hardt | |
| 2004/0047319 A1 | 3/2004 | Elg | |
| 2004/0070912 A1 | 4/2004 | Kopp | |
| 2004/0081089 A1 | 4/2004 | Ayyagari et al. | |
| 2004/0090982 A1 | 5/2004 | Xu | |
| 2004/0128310 A1 | 7/2004 | Zmudzinski et al. | |
| 2004/0165532 A1 | 8/2004 | Poor et al. | |
| 2004/0174829 A1 | 9/2004 | Ayyagari | |
| 2004/0190542 A1 | 9/2004 | Ono et al. | |
| 2004/0210630 A1 | 10/2004 | Simonnet et al. | |
| 2004/0218577 A1 | 11/2004 | Nguyen et al. | |
| 2004/0234073 A1 | 11/2004 | Sato et al. | |
| 2004/0240671 A1 | 12/2004 | Hu et al. | |
| 2004/0264428 A1 | 12/2004 | Choi et al. | |
| 2005/0001694 A1 | 1/2005 | Berkman | |
| 2005/0021539 A1 | 1/2005 | Short et al. | |
| 2005/0025176 A1 | 2/2005 | Ko et al. | |
| 2005/0068227 A1 | 3/2005 | Caspi et al. | |
| 2005/0071631 A1 | 3/2005 | Langer | |
| 2005/0089005 A1 | 4/2005 | Sakoda et al. | |
| 2005/0114489 A1 | 5/2005 | Yonge et al. | |
| 2005/0117515 A1 | 6/2005 | Miyake | |
| 2005/0117750 A1 | 6/2005 | Rekimoto | |
| 2005/0135291 A1 | 6/2005 | Ketchum et al. | |
| 2005/0147075 A1 | 7/2005 | Terry | |
| 2005/0169222 A1 | 8/2005 | Ayyagari et al. | |
| 2005/0190785 A1 | 9/2005 | Yonge, III et al. | |
| 2005/0192037 A1 | 9/2005 | Nanda et al. | |
| 2005/0210157 A1 | 9/2005 | Sakoda | |
| 2005/0243765 A1 | 11/2005 | Schrader et al. | |
| 2005/0249186 A1 | 11/2005 | Kelsey et al. | |
| 2006/0002406 A1 | 1/2006 | Ishihara et al. | |
| 2006/0039371 A1 | 2/2006 | Castro et al. | |
| 2006/0053289 A1 * | 3/2006 | Singh | H04L 9/3273 |
| | | | 713/169 |
| 2006/0072517 A1 | 4/2006 | Barrow et al. | |
| 2006/0077997 A1 | 4/2006 | Yamaguchi et al. | |
| 2006/0104301 A1 | 5/2006 | Beyer et al. | |
| 2006/0120371 A1 | 6/2006 | Huang et al. | |
| 2006/0159260 A1 | 7/2006 | Pereira et al. | |
| 2006/0168647 A1 | 7/2006 | Chiloyan | |
| 2006/0209871 A1 | 9/2006 | Claret et al. | |
| 2006/0224813 A1 | 10/2006 | Rooholamini et al. | |
| 2006/0251017 A1 | 11/2006 | Bishop | |
| 2006/0251021 A1 | 11/2006 | Nakano et al. | |
| 2006/0251107 A1 | 11/2006 | Geren et al. | |
| 2006/0252378 A1 | 11/2006 | Bishop | |
| 2006/0256741 A1 | 11/2006 | Nozaki | |
| 2006/0268746 A1 | 11/2006 | Wijting et al. | |
| 2007/0004404 A1 | 1/2007 | Buckley et al. | |
| 2007/0019609 A1 | 1/2007 | Anjum | |
| 2007/0025244 A1 | 2/2007 | Ayyagari et al. | |
| 2007/0025384 A1 | 2/2007 | Ayyagari et al. | |
| 2007/0025391 A1 | 2/2007 | Yonge, III et al. | |
| 2007/0026794 A1 | 2/2007 | Ayyagari et al. | |

(56) References Cited

U.S. PATENT DOCUMENTS

| | | | |
|---|---|---|---|
| 2007/0030811 A1 | 2/2007 | Frei et al. | |
| 2007/0053520 A1* | 3/2007 | Eckleder | 380/278 |
| 2007/0058661 A1 | 3/2007 | Chow | |
| 2007/0058732 A1 | 3/2007 | Riedel et al. | |
| 2007/0060141 A1 | 3/2007 | Kangude et al. | |
| 2007/0097867 A1 | 5/2007 | Kneckt et al. | |
| 2007/0115973 A1 | 5/2007 | Koga et al. | |
| 2007/0118730 A1 | 5/2007 | Platt | |
| 2007/0133388 A1 | 6/2007 | Lee et al. | |
| 2007/0133449 A1 | 6/2007 | Schacht et al. | |
| 2007/0140185 A1 | 6/2007 | Garg et al. | |
| 2007/0147322 A1 | 6/2007 | Agrawal et al. | |
| 2007/0183445 A1 | 8/2007 | Kim et al. | |
| 2007/0189189 A1 | 8/2007 | Andrews et al. | |
| 2007/0220570 A1 | 9/2007 | Dawson et al. | |
| 2007/0254596 A1 | 11/2007 | Corson et al. | |
| 2007/0271398 A1 | 11/2007 | Manchester et al. | |
| 2007/0286074 A1 | 12/2007 | Xu | |
| 2007/0286111 A1 | 12/2007 | Corson et al. | |
| 2008/0002599 A1 | 1/2008 | Yau et al. | |
| 2008/0151820 A1 | 6/2008 | Solis et al. | |
| 2008/0178003 A1 | 7/2008 | Eastham et al. | |
| 2008/0181219 A1 | 7/2008 | Chen et al. | |
| 2008/0186230 A1 | 8/2008 | Wengler et al. | |
| 2008/0192666 A1 | 8/2008 | Koskan et al. | |
| 2008/0212591 A1 | 9/2008 | Wu et al. | |
| 2008/0222447 A1 | 9/2008 | Ram et al. | |
| 2008/0225774 A1 | 9/2008 | Kim et al. | |
| 2008/0247408 A1 | 10/2008 | Yoon et al. | |
| 2008/0267106 A1 | 10/2008 | Buddhikot et al. | |
| 2008/0279126 A1 | 11/2008 | Katar et al. | |
| 2008/0279204 A1 | 11/2008 | Pratt, Jr. et al. | |
| 2008/0298252 A1 | 12/2008 | Yonge, III et al. | |
| 2008/0298590 A1 | 12/2008 | Katar et al. | |
| 2008/0298594 A1 | 12/2008 | Yonge, III et al. | |
| 2008/0301052 A1 | 12/2008 | Yonge, III et al. | |
| 2008/0301446 A1 | 12/2008 | Yonge, III et al. | |
| 2008/0310414 A1 | 12/2008 | Yonge, III et al. | |
| 2009/0010276 A1 | 1/2009 | Yonge, III et al. | |
| 2009/0034552 A1 | 2/2009 | Yonge, III et al. | |
| 2009/0040930 A1 | 2/2009 | Yonge, III et al. | |
| 2009/0067389 A1 | 3/2009 | Lee et al. | |
| 2009/0074007 A1 | 3/2009 | Yonge, III et al. | |
| 2009/0092075 A1 | 4/2009 | Corson et al. | |
| 2009/0097443 A1 | 4/2009 | Pasanen et al. | |
| 2009/0106551 A1* | 4/2009 | Boren et al. | 713/158 |
| 2009/0116461 A1 | 5/2009 | Yonge, III et al. | |
| 2009/0119190 A1 | 5/2009 | Realini | |
| 2009/0147714 A1 | 6/2009 | Jain | |
| 2009/0154487 A1 | 6/2009 | Ryan et al. | |
| 2009/0207769 A1 | 8/2009 | Park et al. | |
| 2009/0311963 A1 | 12/2009 | Haverty | |
| 2010/0014444 A1 | 1/2010 | Ghanadan et al. | |
| 2010/0072715 A1 | 3/2010 | Crum | |
| 2010/0091760 A1 | 4/2010 | Yoon | |
| 2010/0100724 A1* | 4/2010 | Kaliski, Jr. | 713/155 |
| 2010/0161972 A1 | 6/2010 | Staring et al. | |
| 2012/0072715 A1 | 3/2012 | Yonge, Iii et al. | |
| 2013/0235730 A1 | 9/2013 | Yonge, III et al. | |
| 2013/0272315 A1 | 10/2013 | Yonge et al. | |
| 2013/0287041 A1 | 10/2013 | Yonge, III et al. | |

FOREIGN PATENT DOCUMENTS

| | | |
|---|---|---|
| EP | 1179919 | 7/2010 |
| JP | 3107317 A | 5/1991 |
| JP | 2002135177 A | 5/2002 |
| JP | 2005073240 A | 3/2005 |
| WO | WO9634329 A1 | 10/1996 |
| WO | WO9857439 A1 | 12/1998 |
| WO | WO02103943 A1 | 12/2002 |
| WO | 03010096 | 2/2003 |
| WO | WO03100996 A2 | 12/2003 |
| WO | WO2004038980 A2 | 5/2004 |

OTHER PUBLICATIONS

European Search Report—EP09178487, Search Authority, Munich Patent Office, Jan. 21, 2010.
Faure, Jean-Philippe et al., Call for Submissions. Draft Standard for Broadband over Power Line Networks: Medium Access Control and Physical Layer Specifications. Feb. 14, 2007, 4 pages.
Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.
HomePlug Powerline Alliance Inc., "HomePlug AV White Paper," Doc. Ver. No. HPAVWP-050818, Aug. 2005, pp. 1-11.
International Search Report and Written Opinion—PCT/US2008/065811, International Searching Authority, European Patent Office, Nov. 25, 2008.
International Search Report and Written Opinion—PCT/US2008/065831, International Searching Authority, European Patent Office, Feb. 20, 2009, 22 pages.
Katar et al., "Beacon Schedule Persistence to Mitigate Beacon Loss in HomePlug AV Networks," May 2006, IEEE 1-4244-0113-05/06, pp. 184-188.
Lee et al., "HomePlug 1.0 Powerline Communication LANs-Protocol Description and Performance Results version 5.4," 2000, International Journal of Communication Systems, 2000 00: 1-6, pp. 1-25.
Loh et al, Quality of Support and priority Management in HomePNA 2.0 Link Layer, IEEE, 6 pages, 2003.
Notification of First Office Action, the State Intellectual Property Office of the People's Republic of China, issued in Chinese Application No. 200610107587.1, dated Oct. 11, 2010, 6 pages.
Notification of Reasons for Rejection, Japanese Patent Office, issued in Japanese Patent Application No. 2006-205200, dated Jan. 18, 2011, 3 pages.
Opera Specification—Part 1: Technology, Open PLC European Research Alliance, 198 pages, 1006.
Co-pending U.S. Appl. No. 13/113,474, filed May 23, 2011, 32 pages.
"U.S. Appl. No. 11/970,271 Final Office Action", Jul. 19, 2011, 21 pages.
"U.S. Appl. No. 11/970,271 Office Action", Mar. 9, 2012, 19 pages.
"U.S. Appl. No. 11/970,271 Office Action", Oct. 7, 2011, 20 pages.
"U.S. Appl. No. 11/970,271 Office Action", Dec. 7, 2010, 21 pages.
"U.S. Appl. No. 11/970,297 Final Office Action", Apr. 16, 2012, 32 pages.
"U.S. Appl. No. 11/970,297 Office Action", Mar. 30, 2011, 30 pages.
"U.S. Appl. No. 11/970,297 Office Action", Sep. 29, 2011, 31 pages.
"U.S. Appl. No. 11/970,323 Office Action", Dec. 7, 2010, 12 pages.
"U.S. Appl. No. 11/971,446 Office Action", Feb. 15, 2011, 20 pages.
"U.S. Appl. No. 11/971,446 Final Office Action", Jul. 1, 2011, 17 pages.
"U.S. Appl. No. 12/108,334 Final Office Action", Jun. 14, 2011, 28 pages.
"U.S. Appl. No. 12/108,334 Office Action", Feb. 16, 2011, 26 pages.
"U.S. Appl. No. 12/108,334 Office Action", Aug. 3, 2010, 20 pages.
"U.S. Appl. No. 12/133,270 Final Office Action", Nov. 18, 2011, 23 pages.
"U.S. Appl. No. 12/133,270 Office Action", Jun. 3, 2011, 67 pages.
"U.S. Appl. No. 12/133,301 Final Office Action", Mar. 22, 2011, 39 pages.
"U.S. Appl. No. 12/133,301 Office Action", Sep. 22, 2010, 42 pages.
"U.S. Appl. No. 12/133,301 Office Action", Mar. 1, 2012, 38 pages.
"U.S. Appl. No. 12/133,312 Final Office Action", Feb. 16, 2011, 24 pages.
"U.S. Appl. No. 12/133,312 Office Action", Jun. 8, 2011, 24 pages.
"U.S. Appl. No. 12/133,312 Office Action", Jul. 28, 2010, 29 pages.
"U.S. Appl. No. 12/133,315 Final Office Action", Jun. 9, 2011, 38 pages.
"U.S. Appl. No. 12/133,315 Final Office Action", Jul. 20, 2010, 30 pages.
"U.S. Appl. No. 12/133,315 Office Action", Dec. 24, 2009, 28 pages.
"U.S. Appl. No. 12/133,315 Office Action", Dec. 28, 2010, 36 pages.
"U.S. Appl. No. 12/133,325 Final Office Action", Dec. 9, 2010, 33 pages.

(56) References Cited

OTHER PUBLICATIONS

"U.S. Appl. No. 12/133,325 Office Action", May 27, 2010, 31 pages.
"U.S. Appl. No. 12/108,334 Office Action", Aug. 3, 2012, 18 pages.
"U.S. Appl. No. 12/133,315 Office Action", Aug. 9, 2012, 37 pages.
Notification of First Office Action, The State Intellectual Property Office of the People's Republic of China, issued in Chinese Application No. 200880100486.9, Nov. 21, 2012, 11 pages.
"U.S. Appl. No. 13/303,913 Office Action, Dec. 26, 2012, 37 pages."
U.S. Appl. No. 12/133,301 Final Office Action, Sep. 26, 2012, 54 pages.
Muir, Andrew et al., "An Efficient Packet Sensing MAC Protocol for Wireless Networks", 20 Pages.
Co-pending U.S. Appl. No. 13/873,168, filed Apr. 29, 2013, 20 pages.
"U.S. Appl. No. 131113,474 Office Action", Jun. 17, 2013, 10 pages.
Co-pending U.S. Appl. No. 13/917,394, filed Jun. 13, 2013, 34 pages.
"U.S. Appl. No. 121133,301 Office Action", Sep. 25, 2013, 44 pages.
"U.S. Appl. No. 13/873,168 Office Action", Dec. 16, 2013, 23 pages.
Co-pending U.S. Appl. No. 13/933,924, filed Jul. 2, 2013, 36 pages.
"U.S. Appl. No. 12/133,301 Office Action", Oct. 2, 2014, 34 pages.
"U.S. Appl. No. 13/303,913 Final Office Action", Sep. 16, 2014, 8 pages.
"U.S. Appl. No. 11/971,446 Final Office Action", Aug. 27, 2014, 21 pages.
U.S. Appl. No. 11/971,446 Office Action, 19 pages, Feb. 14, 2014.
"U.S. Appl. No. 12/133,301 Final Office Action", Apr. 17, 2014, 28 pages.
"U.S. Appl. No. 13/873,168 Final Office Action", Jun. 11, 2014, 22 pages.
"U.S. Appl. No. 12/133,301 Final Office Action", Mar. 16, 2015, 36 pages.
"U.S. Appl. No. 13/917,394 Final Office Action", Feb. 23, 2015, 54 pages.
"U.S. Appl. No. 13/917,394 Office Action", Oct. 17, 2014, 49 Pages.
"U.S. Appl. No. 11/970,297 Office Action", Jan. 21, 2015, 38 pages.
Yonge, III, Lawrence W. et al., "Managing Communications Over a Shared Medium", Co-pending U.S. Appl. No. 13/933,924, filed Jul. 2, 2013, 36 pages Sep. 18, 2013, 36 pages.
"U.S. Appl. No. 13/933,924 Office Action", Jun. 12, 2015, 18 pages.
"U.S. Appl. No. 12/133,301 Office Action", Jul. 1, 2015, 37 pages.
"U.S. Appl. No. 11/970,297 Final Office Action", Aug. 27, 2015, 41 pages.
"U.S. Appl. No. 13/933,924 Final Office Action", Nov. 10, 2015, 21 pages.
"U.S. Appl. No. 11/970,297 Office Action", Mar. 11, 2016, 43 pages.
"U.S. Appl. No. 12/133,301 Final Office Action", Feb. 5, 2016, 45 pages.

\* cited by examiner

ESTABLISHING A UNIQUE END-TO-END MANAGEMENT KEY

RELATED APPLICATIONS

This application is a utility of U.S. Provisional Application Ser. No. 60/941,949, entitled "MANAGING COMMUNICATIONS OVER A SHARED MEDIUM," filed on Jun. 4, 2007, which is hereby incorporated by reference.

TECHNICAL FIELD

The invention relates to managing secured end-to-end communications over a shared medium.

BACKGROUND

A network of communication stations can share a communication medium (e.g., wires connecting multiple stations or a spectrum for transmitting radio signals among stations) using any of a variety of access techniques. Security for a shared communication medium network can be difficult since there is no protection from other devices that are connected to the shared medium. For example, two stations that are connected to a shared medium cannot communicate with each other in a secure manner without the danger of being subjected to snooping by other devices connected to the shared medium.

SUMMARY

The following are various aspects described herein. In one aspect computer implemented authentication methods are disclosed. Such methods can include: receiving a connection request from a first station at a second station, the connection request comprising a first pseudo-random number associated with the first station; generating a second pseudo-random number associated with the second station; communicating an end-to-end management key request to an authorization server, the end-to-end management key request comprising a first pseudo-random number associated with the first station and the second pseudo random number associated with the second station; receiving a communication comprising an end-to-end management key and the second pseudo random number, the communication being encrypted using a device access key associated with the second station; decrypting the communication using the device access key associated with the second station; and, authenticating the end-to-end management key based on the second pseudo-random number included in the communication.

Still further methods can include: receiving an end-to-end management key request, the end-to-end management key request comprising a first pseudo random number associated with an originating station and a second pseudo random number associated with a receiving station; encrypting an first end-to-end management key response, the first end-to-end management key response comprising an end-to-end management key and a first pseudo-random number encrypted using a first device access key associated with the originating station; encrypting an second end-to-end management key response, the second end-to-end management key response comprising an end-to-end management key and a second pseudo-random number encrypted using a second device access key associated with the receiving station; and, communicating the first and second end-to-end management key responses to the originating and receiving stations, respectively.

Systems can include a first station and a second station attempting to establish a communication session. An authorization server can receive an end-to-end management key request from one or more of the stations and provide a first response and a second response. The first response including an end-to-end management key and a first pseudo-random number associated with the first station, both being encrypted using a first device access key associated with the first station. The second response can include the end-to-end management key and the second pseudo random number associated with the second device, both being encrypted using a second device access key associated with the second station. The first station can authenticate the first response based upon decrypting the first response and identifying the first pseudo-random number, and the second station can authenticate the second response based upon decrypting the second response and identifying the second pseudo-random number.

Other systems can use an authorization server to provide an end-to-end management key used to facilitate communications between a first station and a second station, wherein the authorization server has a device access key associated with the first station and a device access key associated with the second station. The authorization server can receive a first nonce associated with the first station, and a second nonce associated with the second station. The authorization server can send a first encrypted message to the first station, the first encrypted messing being encrypted using the device access key associated with the first station and including the first station nonce and the end-to-end management key, and can send a second encrypted message to the second station, the second encrypted message being encrypted using the device access key associated with the second station and including the second station nonce and the end-to-end management key.

Other aspects will be found in the detailed description, drawings and claims.

DETAILED DESCRIPTION

There are a many possible implementations of the invention, some example implementations are described below. However, such examples are descriptions of various implementations, and not descriptions of the invention, which is not limited to the detailed implementations described in this section but is described in broader terms in the claims.

Figure 1:
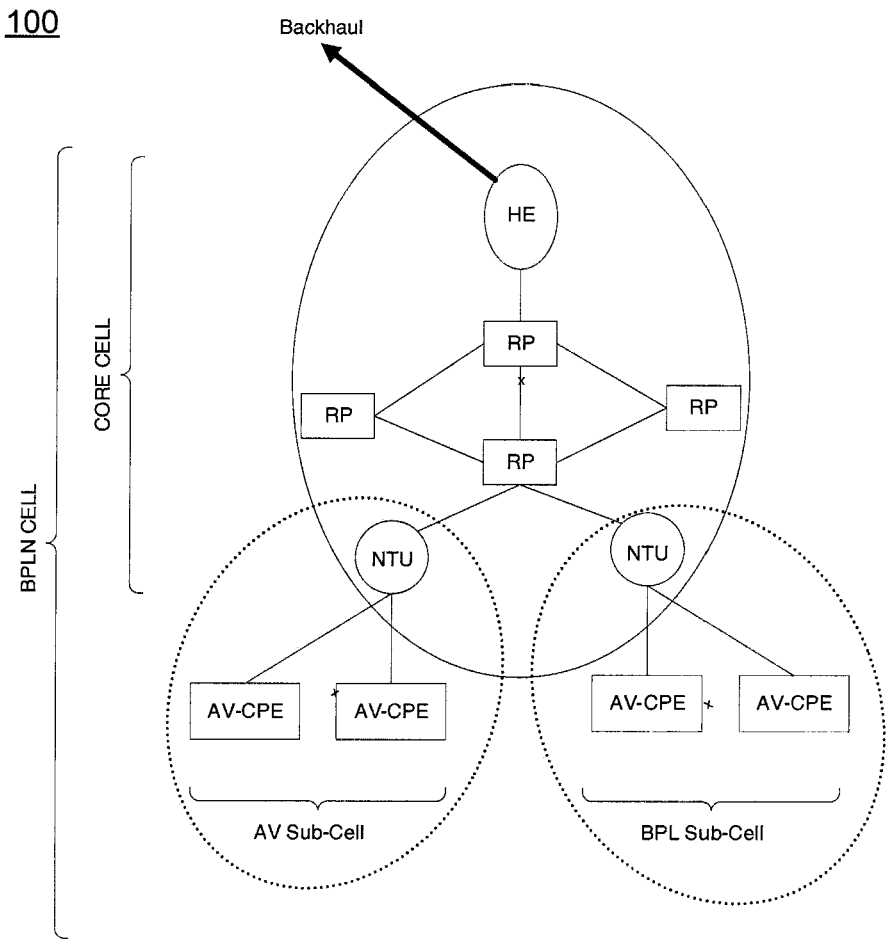
FIG. 1 is a schematic diagram of a communication network.

FIG. 1 shows an exemplary network configuration for an access network 100 such as a broadband power line Network (BPLN) that provides access to a backhaul network. The BPLN can be managed by a service provider entity having access to the underlying physical power line medium. BPLN is a general purpose network that can be used for several types of applications including, smart grid management, broadband internet access, voice and video delivery services, etc. In various implementations, BPLN can be deployed on low voltage, medium voltage and high voltage power lines. Additionally, BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more cells. A cell is a group of broadband power line (BPL) devices in a BPLN that have similar characteristics such as association management, security, QoS and channel access settings, for example. Cells in a BPLN are logically isolated from each other, and communication to and from the backhaul occurs within the cell. Each cell in a BPLN includes a core-cell and may also include one or more sub-cells. There can be more than one cell on a given physical power line medium.

A core-cell includes a group of devices in a BPLN that includes a head end (HE), repeaters (R), and network termination units (NTU), but can exclude customer premise equipment (CPE). The head end (HE) is a device that bridges a cell to the backhaul network. At a given time, a cell will have one active head end and the head end manages the cell including the core-cell and any associated sub-cells. A repeater (RP) is a device that selectively retransmits media access control (MAC) service data units (MSDUs) to extend the effective range and bandwidth of the BPLN cell. Repeaters can also perform routing and quality of service (QoS) functions. The NTU is a device that connects a BPLN cell to the end users' network or devices. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single device may be designed to perform multiple functions. For example, a single device can simultaneously be programmed to perform the tasks associated with an RP and an NTU.

Various types of CPE devices (e.g., a computer) can be used as endpoint nodes in the network and such devices can communicate with other nodes in the network through the NTU.

Various types of CPE devices (e.g., a computer) can be used as endpoint nodes in the network and such devices can communicate with other nodes in the network through the NTU, any number of repeaters (e.g., including no repeaters), and the head end.

Each node in the network communicates as a communication "station" (STA) using a PHY layer protocol that is used by the nodes to send transmissions to any other stations that are close enough to successfully receive the transmissions. STAs that cannot directly communicate with each other use one or more repeater STAs to communicate with each other. Any of a variety of communication system architectures can be used to implement the portion of the network interface module that converts data to and from a signal waveform that is transmitted over the communication medium. An application running on a station can provide data to and receives data from the network interface module. A MSDU is a segment of information received by the MAC layer. The MAC layer can process the received MSDUs and prepares them to generate "MAC protocol data units" (MPDUs). A MPDU is a segment of information including header and payload fields that the MAC layer has asked the PHY layer to transport. An MPDU can have any of a variety of formats based on the type of data being transmitted. A "PHY protocol data unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors. A preferred implementation of the MAC and PHY layers used by powerline medium is that based on HomePlug AV specification.

One implementation of the PHY layers is to use OFDM modulation. In OFDM modulation, data are transmitted in the form of OFDM "symbols." Each symbol has a predetermined time duration or symbol time Ts. Each symbol is generated from a superposition of N sinusoidal carrier waveforms that are orthogonal to each other and form the OFDM carriers. Each carrier has a peak frequency fi and a phase $\Phi i$ measured from the beginning of the symbol. For each of these mutually orthogonal carriers, a whole number of periods of the sinusoidal waveform is contained within the symbol time Ts. Equivalently, each carrier frequency is an integral multiple of a frequency interval $\Delta f=1/Ts$. The phases $\Phi i$ and amplitudes Ai of the carrier waveforms can be independently selected (according to an appropriate modulation scheme) without affecting the orthogonality of the resulting modulated waveforms. The carriers occupy a frequency range between frequencies f1 and fN referred to as the OFDM bandwidth.

Figure 2:
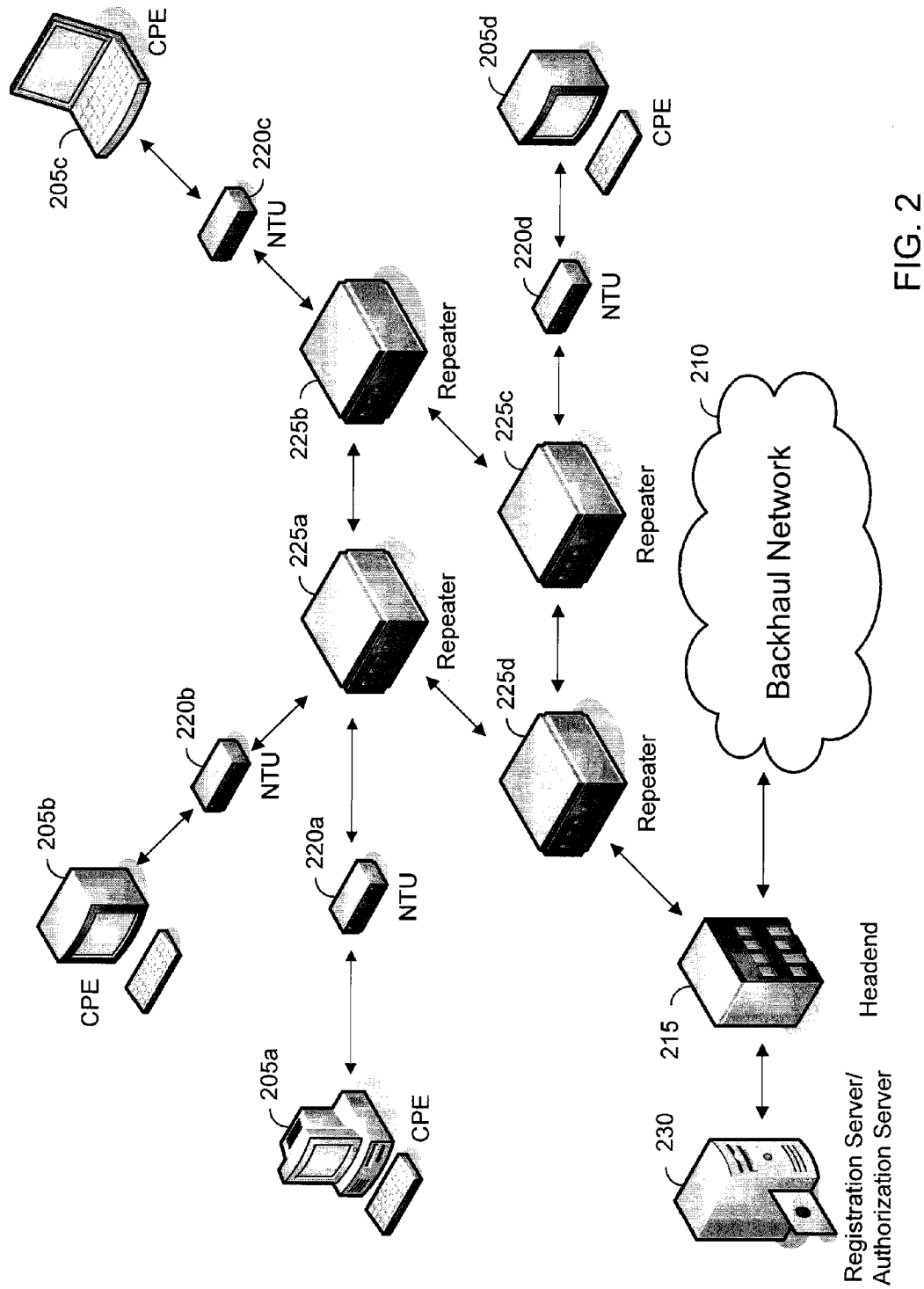
FIG. 2 is a block diagram of a powerline communication network.

FIG. 2 is a block diagram of a powerline communication network. In various implementations, a powerline communication network can enable customer premises equipment (CPE) devices 205*a-d* to access a backhaul network 210 through a gateway (e.g., a headend 215). In various implementations, there can be multiple gateways to the backhaul network 210. For example, it can be inefficient for a CPE device in one city to be required to send a signal to another city prior to accessing the backhaul network 210 (e.g., the Internet).

The CPE devices 205*a-d* can communicate with the headend 215 through a network of network termination units 220*a-d* and repeaters 225*a-d*. In some implementations, the network termination units can operate to translate the data signals from the CPE devices in any of a variety of communications protocols onto a powerline network. For example, a CPE 205*a-d* might communicate with an NTU 220*a-d* using a IEEE 802.11 wireless protocol, and the NTU 220*a-d* can convert the wireless signal to a signal suitable for transmission on a powerline medium. Systems for transmitting and receiving powerline network signals are further described in FIG. 3.

In various implementations, repeaters 225*a*-*d* can be located throughout the powerline network to provide the ability for a data signal to travel on the powerline carrier medium over long distances. As discussed above, the headend 215 can provide a gateway for the data signal to be transferred to a backhaul network 210. For example, the headend 215 can extract the data signal from the powerline network and convert the signal for transmission on a packet switched network such as the Internet. In various implementations, one or more of the repeaters 225*a*-*d* can be equipped to transfer the signal from the powerline network to the backhaul network 210.

In some implementations, the headend 215 can also include an authorization server. In one implementation, the authorization server is included on the backhaul network 210. The authorization server can be operable to authorize CPE devices 205*a*-*d* for transmission of data over the powerline network. When a CPE device 205*a*-*d* is not authorized, in various implementations, the CPE device 205*a*-*d* can be provided access to a registration server 230. The registration server 230, in various implementations, can enable the user of a CPE device 205*a*-*d* to register the CPE device 205*a*-*d* with the network to obtain access to the powerline network.

In various implementations, the registration server 230 can provide a limited registration to a CPE device 205*a*-*d* to try the powerline network. For example, the registration can be limited by a period of time, bandwidth, destination address, or any other limitation that might allow the user to have limited access to the network. In additional implementations, the registration server 230 can require payment prior to using the network. For example, the registration server can provide web pages operable to collect payment information from the user. In various implementations, the registration server can allow the user to pay for any of a variety of different access plans. For example, an access plan might allow a user to purchase access for a specified period of time, at a specified bandwidth, or combinations thereof. In some implementations, the registration server and authorization server can be co-located as shown in FIG. 2. In some implementations, the registration server can be part of the backhaul network 201. In still further implementations, the registration server is not co-located with the authorization server.

Figure 3:
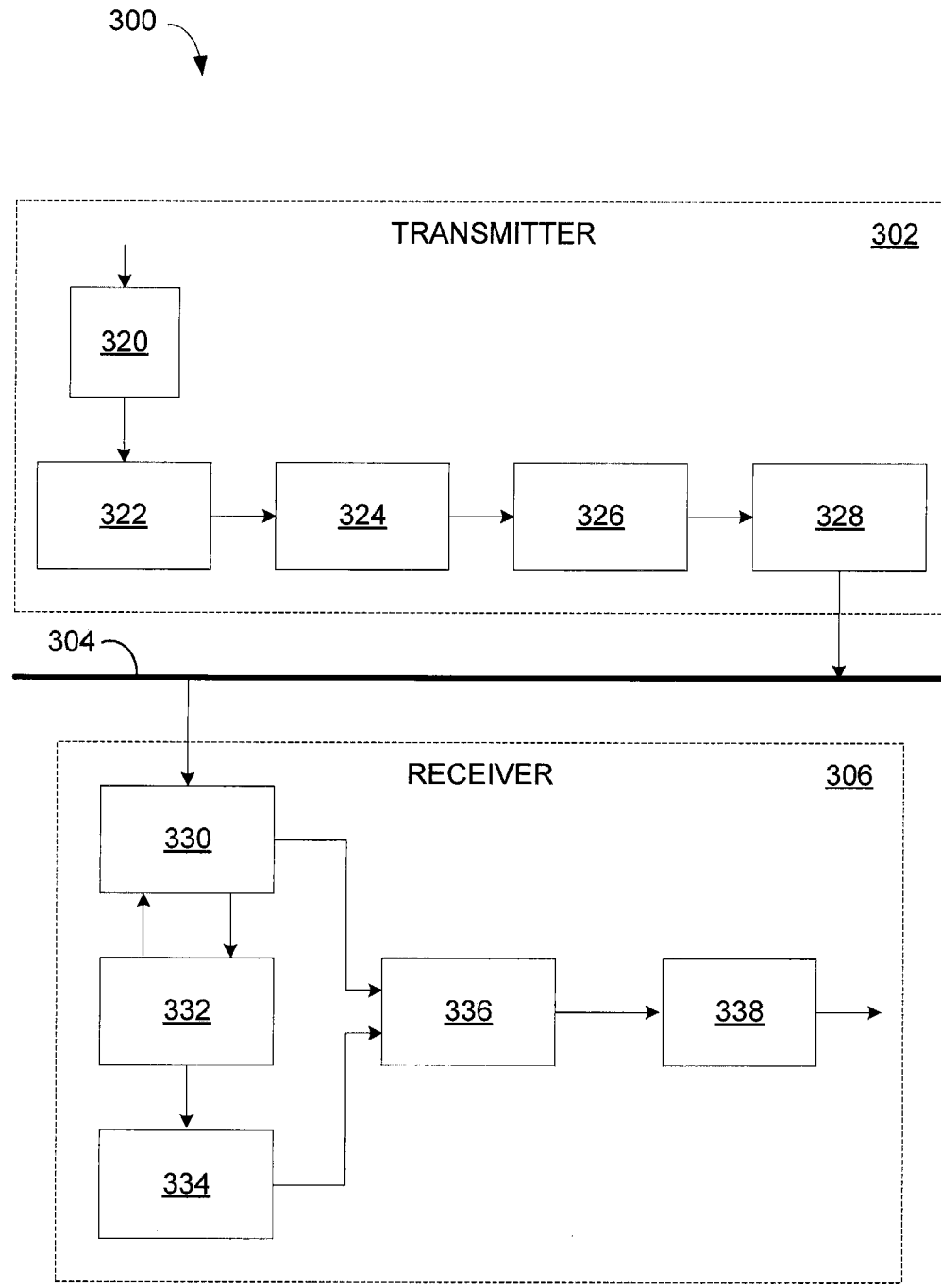
FIG. 3 is a block diagram of a communication system for communicating over a powerline network.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10}=0$). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp(j(2\pi i n / N + \Phi_i))] \quad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An analog front end (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function $g(\tau;t)$ representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an automatic gain control (AGC)

module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including de-interleaving and descrambling).

Any of the modules of the communication system 300 including modules in the transmitter 302 or receiver 306 can be implemented in hardware, software, or a combination of hardware and software.

Figure 4:
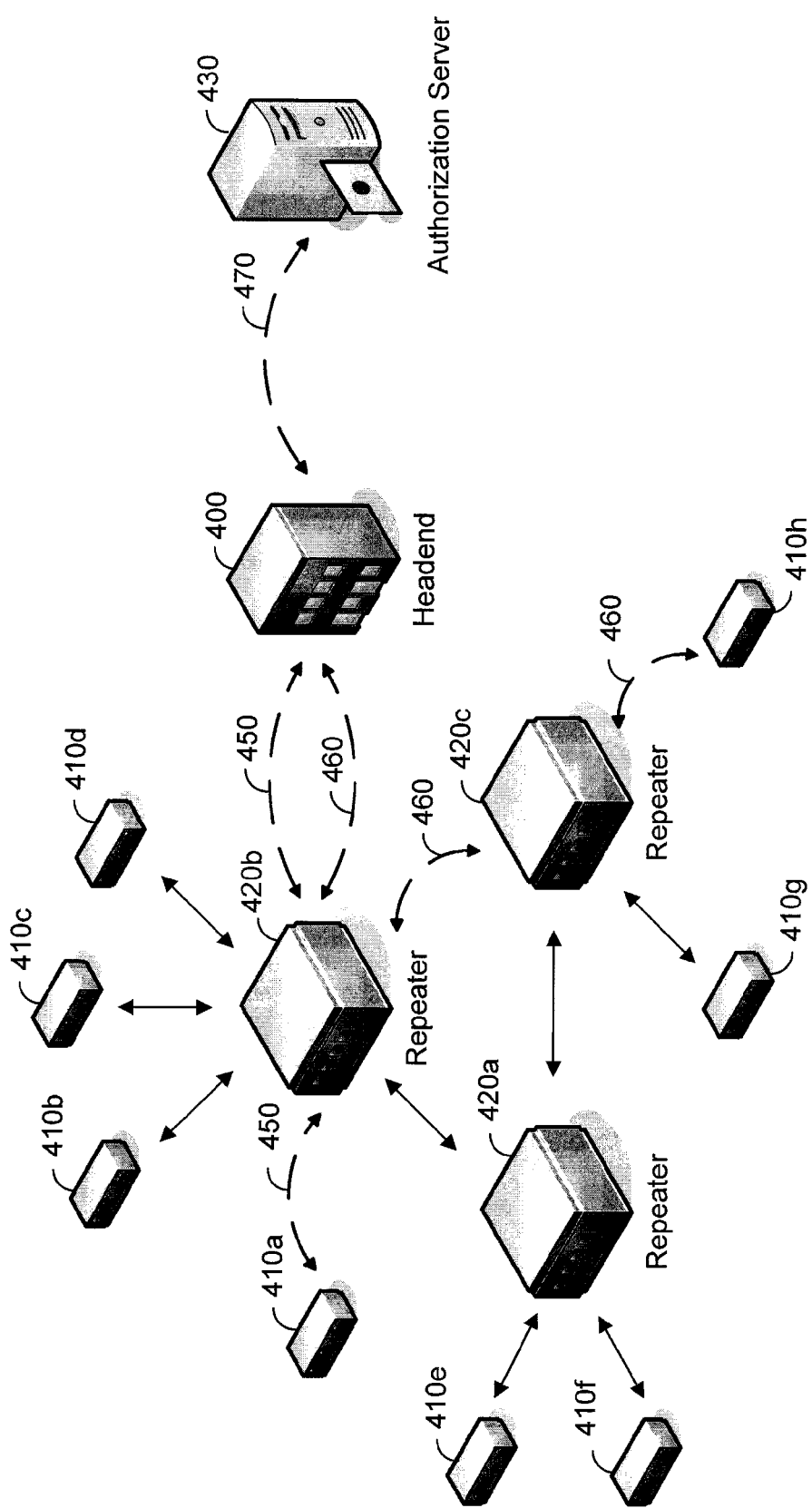
FIG. 4 is a block diagram illustrating a process for providing end-to-end management keys (EMKs) to stations in a network.

FIG. 4 is a block diagram illustrating a process for providing end-to-end management keys to stations in a network. The powerline network, in various implementations, can include a headend 400, number network termination units (NTUs) 410a-h and repeaters 420a-c. The NTUs 410a-h can communicate with a headend 400 through the repeaters 420a-c. The repeaters 420a-c can help to restore losses in the signals over spans in the network prior to the signal reaching a headend 400. The headend 400 can provide a gateway to a backhaul network such as the internet. The powerline network, in various implementations, can also include an authorization server 430. The authorization server 430 can include information about the stations which are allowed access to the powerline network. In various implementations, the authorization server 430 can be collocated with the headend 400 or it can separate from the headend and be a part of the backhaul network (e.g., the internet).

In various implementations, the stations (e.g., repeaters 420a-c and NTUs 410a-h) can use end-to-end management keys (EMKs) to facilitate private communications between stations (e.g., NTU 410a-h, repeaters 420a-c, headend 400, etc.) on the network. The stations that are to communicate with each other can use an EMK to encrypt the communications. The EMK is unknown to other devices on the network, so the communications are substantially secure. The EMK can be distributed to the communicating stations by the authorization server 430. To maintain security, the authorization server 430 can encrypt the EMK communication to the stations.

In some implementations, the stations can send an EMK request to the authorization server 430. In various implementations, the EMK request can include a pseudo-random number generated by the station. The authorization server 430 can include a nonce in addition to the EMK in the response to the EMK request. In some implementations, the response can be encrypted using a device access key (DAK) or a network membership key (NMK) associated with the respective requesting device. The DAK or NMK can be retrieved, for example, from a key store located at the authorization server 430.

In such implementations, the stations can decrypt the response to the EMK request using a DAK or NMK associated with the respective device. Moreover, the stations can authenticate the response and the EMK based upon the nonce included in the response. If the nonce included in the response matches the pseudo-random number included in the request communicated from the station, the EMK is determined to be authentic. In some implementations, the pseudo-random number can be incremented by a function known to both the headend 400 and the station. If the incremented pseudo-random number matches the nonce included in the response, the EMK is determined to be authentic.

In the example of FIG. 4, a first station 410a and a second station 410h desire to communicate with each other. The first station 410a and the second station 410h can transmit EMK requests to the headend 400 as shown by signals 450 and 460, respectively. The EMK requests can include a pseudo random number generated by the respective stations 410a, 410h. In some implementations, the EMK requests can be encrypted using an NMK or a DAK associated with the device.

Upon receiving the EMK requests, the headend 400 can retrieve key information. associated with the requesting devices 410a, 410h, as shown by signal 470. In those implementations where the EMK requests are encrypted, the headend 400 can extract an identifier (e.g., a MAC address) from the requests and can use the extracted identifiers to retrieve an NMK or an DAK to decrypt the EMK requests. The headend 400 can extract the pseudo-random number included in the EMK request and can also generate a new EMK based upon receipt of the requests. The headend 400 can use the pseudo-random numbers included in the requests and the FMK to generate response communications to the first station 410a and second station 410h. The response communications can include a nonce based upon the received pseudo random number and the EMK. In various implementations, the nonce can be identical to the pseudo-random number. In other implementations, the nonce can be the pseudo-random number adjusted by a function known to the headend and to the station. In various implementations, the function can be particular to the specific station. The response communications for each of the first station 410a and the second station 410h can then be encrypted using the retrieved DAK or NMK associated with the respective stations, as shown h the signals 450, 460. The encrypted response communications can be sent to the first station 410 a and the second station 410h.

In various implementations, upon receiving the EMK requests, the headend 400 can forward the request to the authorization server 430 as shows by signal 470. The authorization server 430 can retrieve key information associated with the requesting devices 410a, 410h. In those implementations where the EMK requests are encrypted, the authorization server 430 can extract an identifier (e.g., a MAC address) from the requests and can use the extracted identifiers to retrieve an NMK or a DAK to decrypt the EMK requests. The authorization server 430 can extract the pseudo-random number included in the EMK request and can also generate a new EMK based upon receipt of the requests. The authorization server 430 can use the pseudo-random numbers included in the requests and the EMK to generate response communications to the first station 410a and second station 410h. The response communications can include a nonce based upon the received pseudo random number and the EMK. The response communications for each of the first station 410a and the second station 410h can then be encrypted using the retrieved DAK or NMK associated with the respective stations and send to the headend 400, as shown by the signal 470. The headend 400 can then forward the response to the first station 410a and the second station 410h, as shown by signals 450, 460.

While other stations may receive the response communication, the stations cannot decrypt the response communication without knowledge of the DAK or NMK associated with the respective station 410a, 410h to which the communication is addressed. When the stations 410a, 410h decrypt the response communication, the stations 410a, 410h can compare the nonce to the pseudo-random number to authenticate the received EMK. In other implementations, the stations 410a, 410h can compare the nonce to an adjusted pseudo-random number to authenticate the received EMK. For example, when the pseudo-random number is adjusted by the headend 400 using a function to derive the nonce, the pseudo-random number can be adjusted locally by the station(s) 410a, 410h using the same function for authentication purposes.

Figure 5:
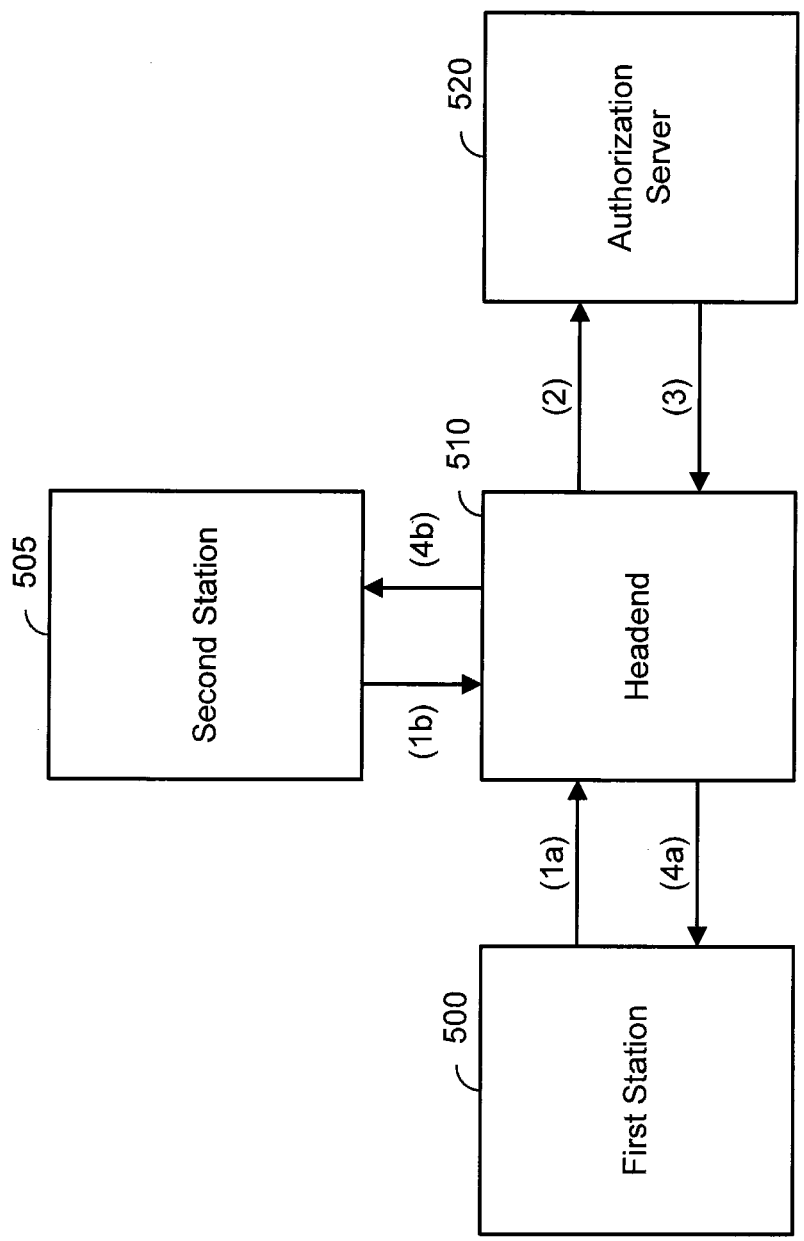
FIG. 5 is a block diagram illustrating a communication flow associated with a first station and a second station requesting an EMK.

FIG. 5 is a block diagram illustrating the communication flow associated with a first station and a second station requesting an end-to-end management key (EMK). A first station 500 and a second station 505 can determine to obtain an EMK to communicate with each other. In various implementations, the first station 500 and the second station 505 can communicate with each other unencrypted or using a network encryption key (NEK) prior to determining to request an EMK. As shown by signals 1(a) and 1(b), the first station 500 and second station 505, respectively, can transmit EMK requests to a headend 510. In some implementations, a first EMK request can include a first pseudo-random number generated by the first station 500, and a second EMK request can include a second pseudo-random number generated by the second station 505.

In various implementations, the first and second EMK requests can be encrypted to prevent other stations from copying the first or second pseudo-random numbers. The first and second EMK requests can be encrypted, for example, using a network membership key (NMK) or a device access key (DAK) respectively associated with the first and second stations 500, 505.

Upon receiving the first and second EMK requests, the headend 510 can forward the requests to the authorization server 515, as shown by signal 2. In some implementations, the authorization server 515 can extract an identifier (e.g., MAC address) from the first and second EMK requests, and use the identifier to retrieve the keys associated with the requesting stations 500, 505. In those implementations where the first and second EMK requests are encrypted, the authorization server 515 can also use the keys associated with the stations to decrypt the first and second EMK requests.

The authorization server 515 can also generate an EMK based upon receipt of the first and second EMK requests. Authorization server 515 can then generate a first response and a second response to the first and second EMK requests, respectively. The first response and second response can include the generated EMK along with a first nonce and second nonce, respectively. The first nonce can be based upon the first pseudo-random number received in the first EMK request, and the second nonce can be based upon the second pseudo-random number received in the second EMK request.

The first response can be encrypted using an NMK or DAK associated with the first station 500. The second response can be encrypted using an NMK or DAK associated with the second station 505. The authorization server 515 can provide the first response and second response to the headend 510, as shown by signal 3. The headend 510 can transmit the first response to the first station as shown by signal 4(a), and can transmit the second response to the second station as shown by signal 4(b).

Upon receipt of the first response, the first station 500 can decrypt the first response using its NMK or DAK. The first station 500 can then identify the first nonce and the EMK from the communication. The first station 500 can authenticate the EMK based upon the first nonce. Similarly, the second station 505 can decrypt the second response using its NMK or DAK. The second station 505 can then identify the second nonce and the EMK from the communication. The second station 505 can authenticate the EMK based upon the second nonce. In various implementations, the first and second nonces can be authenticated based upon matching the first and second pseudo-random numbers, respectively.

Figure 6:
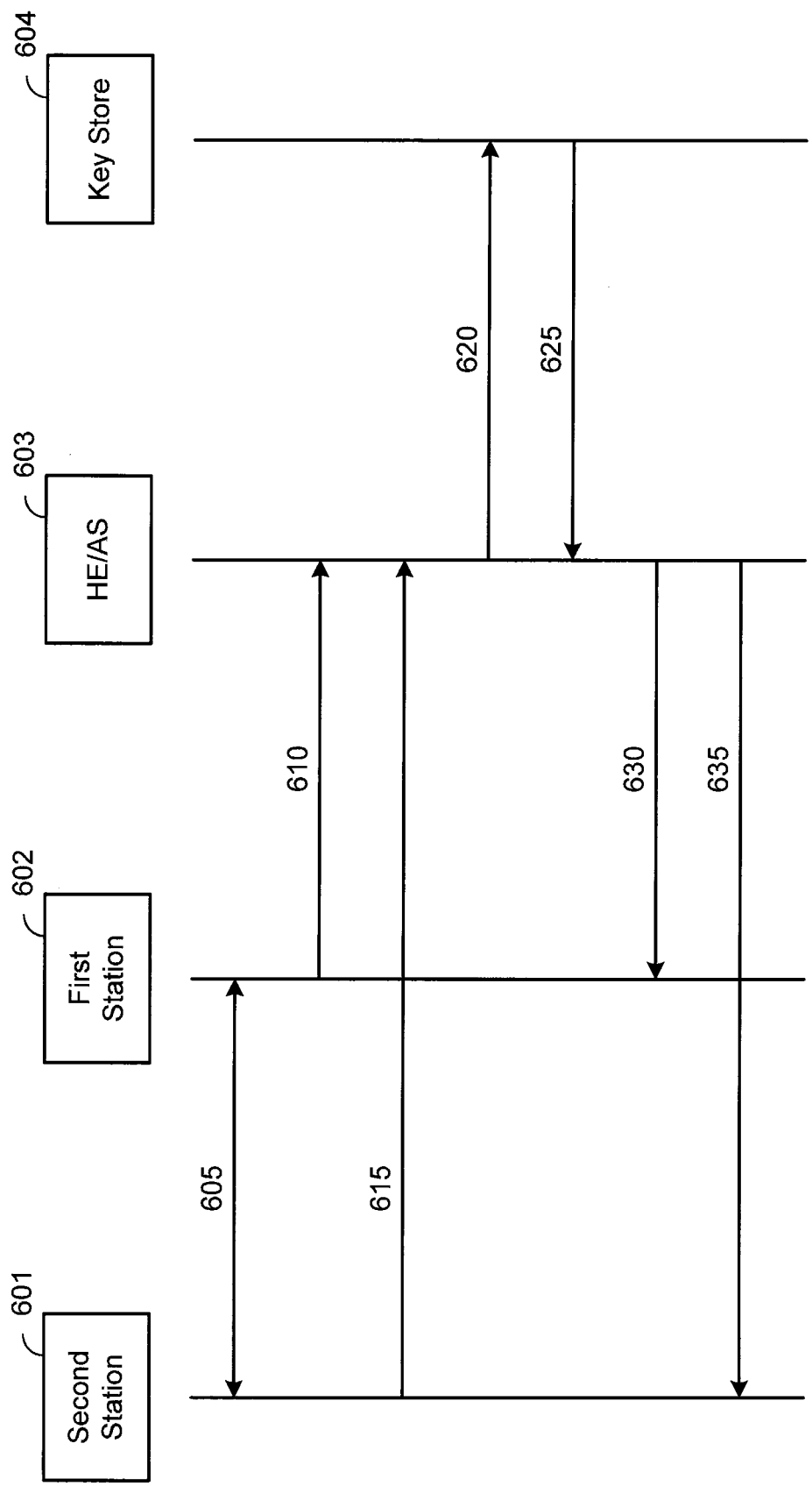
FIG. 6 is a flow diagram illustrating an example flow for distribution of EMKs.

FIG. 6 is a flow diagram depicting an example flow for distribution of end-to-end management keys (EMKs). A first station 602 and a second station 601 can communicate with each other to determine whether to request an EMK, as shown by signal 605. The first station 602 can transmit a first EMK request to the headend or authorization server 603, as shown by signal 610. The first EMK request can include a first pseudo-random number generated by the first station 602 and can be encrypted using a first key associated with the first station 602. The second station 601 can transmit a second EMK request to the headend or authorization server 603, as shown by signal 615. The second EMK request can include a second pseudo-random number generated by the second station 601 and can be encrypted using a second key associated with the second station 601, as shown by signal 615.

In response to the receipt of the first and second EMK requests, the headend or authorization server 603 can submit a query to a key store 604 as shown by signal 620. The query can include identifiers (e.g., MAC addresses) associated with the first and second queries. The key store 604 can provide the first key and the second key to the headend or authorization server 603. In various implementations, the first key can be used to decrypt the first EMK request and the second key can be used to decrypt the second EMK request. The headend or authorization server 603 can also generate an EMK. Upon generation of the EMK, the headend or authorization server 603 can generate a first response including a first nonce and the EMK, and can generate a second response including a second nonce and the EMK. The first and second nonces can be based upon the received first and second pseudo-random numbers, respectively. The headend or authorization server 603 can also encrypt the first and second responses using the retrieved first and second keys, respectively. The first and second responses can be transmitted to the first and second stations 602, 601, as shown by signals 630 and 635, respectively.

Upon receipt of the first response, the first station can decrypt the first response using the first key. The EMK can then be authenticated based upon the first nonce included in the first response. In various implementations, if the first nonce matches the first pseudo-random number, the received EMK is determined to be authentic. Similarly, the second station 601 can decrypt the second response using the second key. The EMK can then be authenticated based upon the second nonce included in the second response. In various implementations, if the second nonce matches the second pseudo-random number, the received EMK is determined to be authentic. The first station 602 and second station 601 can then begin communicating.

Figures 7, 8:
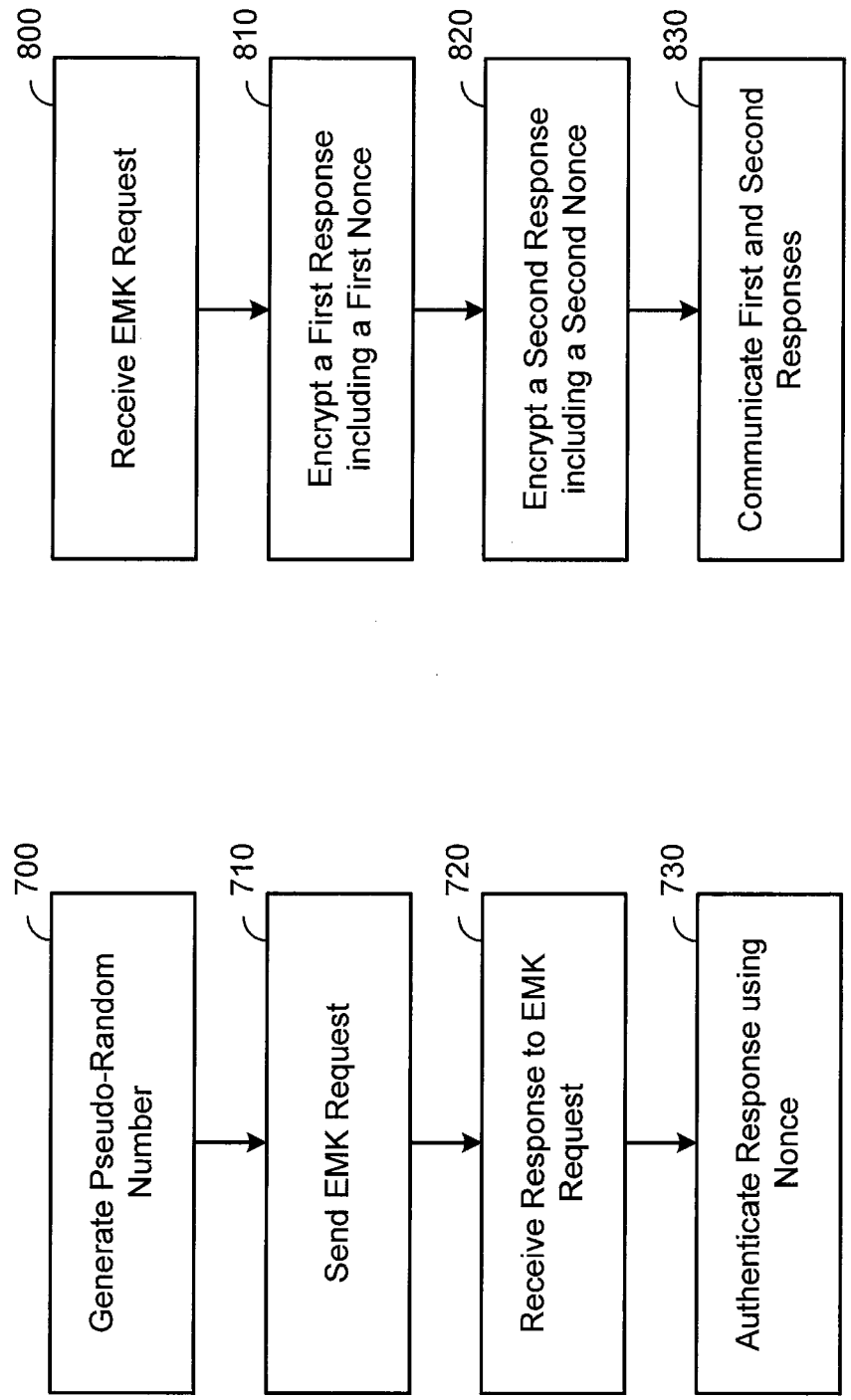
FIG. 7 is a flow diagram depicting an example method for requesting an EMK.
FIG. 8 is a flow diagram illustrating an example method for distributing an EMK.

FIG. 7 is a flowchart illustrating an example method to request an end-to-end management key. At stage 700, a pseudo-random number is generated. The pseudo-random number can be generated, for example, by a station (e.g., NTU 410a-h or repeater 410a-c of FIG. 4). The pseudo-random number, in various examples, can be generated according to any of a number of algorithms and can be of any length.

At stage 710, an EMK request is sent. The EMK request can be sent, for example, by a station (e.g., NTU 410a-h or repeater 410a-c of FIG. 4). In various examples, the EMK request can include a standard request for an EMK and the generated pseudo-random number. In some implementations, the EMK request can be encrypted. The EMK request can be encrypted, for example, using a key associated with the station (e.g., a network membership key (NMK), a device access key (DAK), etc.).

At stage 720, a response to the EMK request is received. The response to the EMK request can be received, for example, by a station (e.g., NTU 410*a-h* or repeater 410*a-c* of FIG. 4). In various implementations, the response can include an EMK and a nonce. The EMK can be generated by a headend device and transmitted to each device in the network with which the station is attempting to communicate. In various implementations, the response to the EMK can be encrypted. For example, the response can be encrypted using the station's NMK or DAK. In such implementations, the response can be decrypted and parsed by the station to identify the EMK and the nonce.

At stage 730, the response can be authenticated based upon the nonce. The response can be authenticated, for example, by a station (e.g., NTU 410*a-h* or repeater 410*a-c* of FIG. 4). In various implementations, the response can be authenticated based upon comparing the nonce to the pseudo-random number generated in step 700. If the nonce matches the pseudo-random number, the response is authentic. In other implementations, the nonce can be compared to an adjusted pseudo-random number. The pseudo-random number can be adjusted, for example, by a function known to both the headend/authorization server and to the station. Thus, if a headend/authorization server device did not properly adjust the transmitted pseudo-random number to produce the nonce, the response can be deemed not to be authentic.

FIG. 8 is a flowchart illustrating an example method to distribute an end-to-end management key (EMK). At stage 800, an EMK request is received. The EMK request can be received, for example, by a headend device (e.g., headend 400 of FIG. 4). In various implementations, the EMK request can be encrypted based upon the station transmitting the request. In such implementations, the headend device can retrieve a key associated with the device and decrypt the EMK request.

At stage 810, a first response is encrypted. The first response can be encrypted, for example, by a headend device (e.g., headend 400 of FIG. 4). In various implementations, the first response can include a first nonce based upon a first pseudo-random number received with the EMK request. The first response, for example, can be encrypted using a key associated with a first station.

At stage 820, a second response is encrypted. The second response can be encrypted, for example, by a headend device (e.g., headend 400 of FIG. 4). In various implementations, the second response can include a second nonce based upon a second pseudo-random number received with the EMK request. The second response, for example, can be encrypted using a key associated with a second station requesting the EMK.

At stage 830, the first and second responses are communicated. The first and second responses can be communicated, for example, by a headend device(e.g., headend 400 of FIG. 4). In various implementations, the communication can be made on a broadband over powerline network.

In various implementations, stations can establish communication links between themselves using an end-to-end management key (EMK). In such implementations, a first station can communicate a connection request to a second station. The connection request can include a first pseudo-random generated by the first station. The second station, upon receiving the request can generate a second pseudo-random number, and an EMK request comprising the first and second pseudo-random numbers. The second station can communicate the EMK request to an authorization server. In some implementations, the EMK request can be encrypted using one or more of a first or second DAK associated with the first or second stations, respectively. In other implementations, the EMK request can be encrypted using one or more of a first or second NMK associated with the first or second stations, respectively.

Upon receiving the EMK request from the second station, the authorization server can generate a first response to the EMK request. The first response can include an EMK and the first pseudo-random number, and can be encrypted using a first DAK associated with the first station. The first DAK or NMK can be retrieved based upon a first unique identifier associated with the EMK request. The authorization server can also generate a second response to the EMK request. The second response can include an EMK and the second pseudo-random number, and can be encrypted using a second DAK associated with the second station. The second DAK or NMK can be retrieved based upon a second unique identifier associated with the EMK request.

In some aspects, the first station can receive the first response based upon its ability to decrypt the first response using its DAK or NMK. The first station can identify the pseudo-random number included in the response to authenticate the first response, and can use the EMK to begin communications with the second station.

Further, the second station can receive the second response based upon its ability to decrypt the second response using its DAK or NMK. The second station can identify the pseudo-random number included in the response to authenticate the second response, and can use the EMK to begin communications with the first station. Thus, communications between the first and second station can be encrypted using a common EMK communicated securely to each of the stations.

In alternative aspects, the first station can receive the first response based upon its ability to decrypt the first response using its DAK or NMK. The first station can identify the pseudo-random number included in the response to authenticate the first response. Similarly, the second station can receive the second response based upon its ability to decrypt the second response using its DAK or NMK. The second station can identify the pseudo-random number included in the response to authenticate the second response. After receiving their respective first and second responses, the first station and the second station can establish a secure point-to-point connection using the EMK to establish an end-to-end key (EEK). For example, the first station can generate the EEK and can send a set key request to the second station to request that the second station use the EEK to encrypt communications between the first station and the second station. Alternatively, the second station can generate the EEK and send a set key request to the first station to request that the first station use the EEK to encrypt communications between the first station and the second station. In either case, the set key request can be encrypted using the EMK.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A method for authorizing end-to-end communication, the method comprising:
   receiving, by a second station from a first station, a connection request message, the connection request message including a first pseudo-random number and a first identifier associated with the first station;
   transmitting, by the second station, a key request message to an authorization server for an end-to-end management key, the key request message including the first identifier, the first pseudo-random number, a second identifier associated with the second station and a second pseudo-random number associated with the second station;
   receiving, by the second station from the authorization server, a first response message that includes the end-to-end management key and a first nonce that is based, at least in part, on the second pseudo-random number; and
   authenticating, by the second station, the end-to-end management key based, at least in part, on determining that the first nonce corresponds to the second pseudo-random number.

2. The method of claim 1, wherein the first response message is encrypted using a second-station key associated with the second station and wherein the method further comprises decrypting the first response message using the second-station key.

3. The method of claim 1, further comprising, receiving, by the first station from the authorization server, a second response message that includes the end-to-end management key and a second nonce that is based on the first pseudo-random number, wherein the second response message is encrypted using a first-station key associated with the first station.

4. The method of claim 3, wherein the first station authenticates the end-to-end management key included in the second response message based on the second nonce.

5. The method of claim 1,
   wherein the first nonce is derived by adjusting the second pseudo-random number according to a function known by the second station and the authorization server, and
   wherein said determining that the first nonce corresponds to the second pseudo-random number comprises adjusting, by the second station, the second pseudo-random number according to the function and comparing the adjusted second pseudo-random number to the first nonce.

6. The method of claim 1, further comprising:
   transmitting, by one of the first station and the second station to the other of the first station and the second station, a set key request to establish an end-to-end key for use in encrypting communications between the first station and the second station, the set key request encrypted using the end-to-end management key.

7. A method implemented by an authorization server comprising:
   receiving a request for an end-to-end management key to facilitate communication between a first station and a second station, the request including a first identifier associated with the first station, a first pseudo-random number generated by the first station, a second identifier associated with the second station, and a second pseudo-random number generated by the second station; and
   in response to receiving the request for the end-to-end management key, transmitting a first response message to the first station and a second response message to the second station,
   wherein the first response message is encrypted utilizing a first-station key, the first response message comprising the end-to-end management key and a first nonce that is based, at least in part, on the first pseudo-random number, and
   wherein the second response message is encrypted utilizing a second-station key associated with the second station, the second response message comprising the end-to-end management key and a second nonce that is based, at least in part, on the second pseudo-random number.

8. The method of claim 7, further comprising generating the end-to-end management key in response to the request.

9. The method of claim 7, wherein the first station sends a first request to the second station, the first request including the first pseudo-random number, and wherein the second station forwards at least a portion of the first request to the authorization server in the request for the end-to-end management key.

10. The method of claim 7, wherein the first station and the second station decrypt the first response message and the second response message, respectively, and use the first nonce and the second nonce, respectively, to validate authenticity of the end-to-end management key.

11. The method of claim 10, wherein the first station and the second station use the first nonce and the second nonce to validate the authenticity of the end-to-end management key, respectively, by adjusting the first pseudo-random number and the second pseudo-random number by a first function and a second function, respectively, and by comparing the adjusted first pseudo-random number and the adjusted second pseudo-random number with the first nonce and the second nonce, respectively.

12. The method of claim 7, further comprising:
transmitting, by one of the first station and the second station to the other of the first station and the second station, a set key request to establish an end-to-end key for use in encrypting communications between the first station and the second station, the set key request encrypted using the end-to-end management key.

13. A system comprising:
a first station configured to transmit a connection request message to a second station, the connection request message including a first identifier associated with the first station and a first pseudo-random number generated by the first station;
the second station configured to transmit a request message to an authorization server for an end-to-end management key, the request message including the first identifier, the first pseudo-random number, a second identifier associated with the second station, and a second pseudo-random number generated by the second station; and
the authorization server configured to receive the request message and provide a first response message to the first station and a second response message to the second station,
the first response message including the end-to-end management key and a first nonce that is based, at least in part, on the first pseudo-random number, the first response message encrypted using a first-station key associated with the first station,
the second response message including the end-to-end management key and a second nonce that is based, at least in part, on the second pseudo-random number, the second response message encrypted using a second-station key associated with the second station;
wherein the first station authenticates the end-to-end management key included in the first response message based, at least in part, on determining that the first nonce corresponds to the first pseudo-random number; and
wherein the second station authenticates the end-to-end management key included in the second response message based, at least in part, on determining that the second nonce corresponds to the second pseudo-random number.

14. The system of claim 13, wherein the first station decrypts the first response message using the first-station key, and the second station decrypts the second response message using the second-station key.

15. The system of claim 13,
wherein the first nonce is derived by adjusting the first pseudo-random number according to a first function,
wherein the first station adjusts the first pseudo-random number according to the first function and compares the adjusted first pseudo-random number to the first nonce,
wherein the second nonce is derived by adjusting the second pseudo-random number according to a second function, and
wherein the second station adjusts the second pseudo-random number according to the second function and compares the adjusted second pseudo-random number to the second nonce.

16. The system of claim 15,
wherein the first station and the second station use the first nonce and the second nonce, respectively, to validate the authenticity of the end-to-end management key, by adjusting the first pseudo-random number and the second pseudo-random number by the first function and the second function, respectively, and by comparing the adjusted first pseudo-random number and the adjusted second pseudo-random number with the first nonce and the second nonce, respectively.

17. The system of claim 13, wherein one of the first station and the second station transmits to the other of the first station and the second station, a set key request to establish an end-to-end key for use in encrypting communications between the first station and the second station, the set key request encrypted using the end-to-end management key.

18. An authorization server comprising:
a processor, and
a non-transitory computer-readable medium having stored thereon instructions, that when executed by the processor, cause the authorization server to:
receive a request for an end-to-end management key, the request including a first station identifier associated with a first station, a first pseudo-random number generated by the first station, a second station identifier associate with a second station, and a second pseudo-random number generated by the second station,
in response to the request, generate a first nonce based, at least in part, on the first pseudo-random number by adjusting the first pseudo-random number according to a first function, and generate a second nonce based on the second pseudo-random number by adjusting the second pseudo-random number according to a second function, and
send a first encrypted response message to the first station and a second encrypted response message to the second station, the first encrypted response message being encrypted using a first-station key and including the first nonce and the end-to-end management key, and
the second encrypted response message being encrypted using a second-station key and including the second nonce and the end-to-end management key.

19. The authorization server of claim 18, wherein the authorization server generates the end-to-end management key in response to the request.

20. The authorization server of claim 18,
wherein the first station sends a first request message to the second station, the first request message including the first pseudo-random number; and
wherein the second station forwards at least a portion of the first request message to the authorization server in the request for the end-to-end management key.

21. The authorization server of claim 18,
wherein the first station decrypts the first encrypted response message using the first-station key, and uses the first nonce to validate authenticity of the end-to-end management key included in the first encrypted response message; and wherein the second station decrypts the second encrypted response message using the second-station key, and uses the second nonce to validate authenticity of the end-to-end management key included in the second encrypted response message.

22. The authorization server of claim 18, wherein one of the first station and the second station transmits to the other of the first station and the second station, a set key request to establish an end-to-end key for use in encrypting the communications between the first station and the second station, the set key request encrypted using the end-to-end management key.

* * * * *